(12) United States Patent
Zhu et al.

(10) Patent No.: US 6,728,424 B1
(45) Date of Patent: Apr. 27, 2004

(54) IMAGING REGISTRATION SYSTEM AND METHOD USING LIKELIHOOD MAXIMIZATION

(75) Inventors: Yang-Ming Zhu, Solon, OH (US); Steven M. Cochoff, Chagrin Falls, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 610 days.

(21) Appl. No.: 09/663,803

(22) Filed: Sep. 15, 2000

(51) Int. Cl.[7] .................................................. G06K 9/32
(52) U.S. Cl. ........................ 382/294; 382/128; 382/131
(58) Field of Search ................................ 382/128, 131, 382/132, 294

(56) References Cited

U.S. PATENT DOCUMENTS 6,539,127 B1 * 3/2003 Roche et al. ............... 382/294

OTHER PUBLICATIONS

"Likelihood Maximization Approach to Image Registration" by Zhu et al. "Likelihood Maximization Approach to Image Registration" by Zhu et al. Image Processing, IEEE Transactions on , vol.: 11 Issue: Dec. 12, 2002.*

"A Maximum–Likelihood Approach to PET Emission/Attenuation Image Registration" by Costa et al. Nuclear Science Symposium and Medical Imaging Conference, 1993., 1993 IEEE Conference Record. , Oct. 31–Nov. 6 , 1993 Page(s): 1139–1143.*

"Maximum Likelihood Registration of Dissimilar Sensors" by McMichael et al. Data Fusion Symposium, 1996 IEEE. ADFS '96., First Australian , Nov. 21–22, 1996 Page(s): 31 –34.*

Roche, et al., "Towards a Better Comprehension of Similarity measures Used in Medical Image Registration," *Medical Image Computing and Computer–Assisted Intervention, MICCAI '99.* Taylor, et al. (Eds.) Berlin: Springer–Verleg, pp. 555–556 (1999).

Maes et al., "Multimodality image registration by maximization of mutual information," *IEEE Trans. Med. Imag.*, vol. 16(2), pp. 187–198 (Apr. 1997).

Ritter et al., "Registration of stereo and temporal images of the retina," *IEEE Trans. Med. Imag.*, vol. 18(5), pp. 404–418 (May 1999).

(List continued on next page.)

*Primary Examiner*—Amelia M. Au
*Assistant Examiner*—Chong Kim
(74) *Attorney, Agent, or Firm*—Fay, Sharpe, Fagan, Minnich & McKee, LLP

(57) ABSTRACT

An image processing system and method employs a registration processor (130) to calculate a statistical measure of likelihood for two volumetric images (110, 112). The likelihood is calculated based on an assumption that the voxel values in two images in registration are probabilitically related. The likelihood is calculated for a plurality of relative transformations in iterative fashion until a transformation that maximizes the likelihood is found. The transformation that maximizes the likelihood provides an optimal registration and the parameters for the optimized transform are output to memory (150) for use by a display system (160) in aligning the images for display as a fused or composite image. If statistics about the relationship between the involved images are known, a mutation probability can be derived and used in the likelihood calculation. If there is no such prior knowledge, the mutation probability can be estimated purely from the image data. All voxel pairs in the overlapping volume or, alternatively, a portion of it can be used to compute the likelihood. The optimized likelihood has a simple and less abstract interpretation and can be further used to provide an indication of the quality of the registration.

24 Claims, 3 Drawing Sheets

OTHER PUBLICATIONS

Maes et al., "Comparative evaluation of multiresolution optimization strategies for multimodality image registration by maximization of mutual information," *Med. Image Anal.*, vol. 3(4), pp. 373–386 (1999).

Studholme et al., "Automatic three–dimensional registration of magnetic resonance and positron emission tomography brain images by multiresolution optimization of voxel similarity measures," *Med. Phys.*, vol. 24(1), pp. 25–35 (Jan. 1997).

Zhu, et al., "Likelihood Maximization Approach to Image Registration", Unpublished Manuscript.

West et al., "Retrospective intermodality registration techniques for images of the head: Surface–based versus volume–based," *IEEE Trans. Med. Imag.*, vol. 18(2), pp. 144–150 (Feb. 1999).

Kotz, "Nuclear medicine in the 21st century: Integration with other specialities," *J. Nuc. Med.*, vol. 40(7), pp. 13N–26N (Jul. 1999).

Wells, III, et al., "Multi–modal volume registration by maximization of mutual information," *Medical Image Analysis*, vol. 1(1), pp. 35–51 (1996).

Andersson et al., "A Method for coregistration of PET and MR brain images," *J. Nucl. Med.*, vol. 36, pp. 1307–1315 (1995).

Press et al., *Numerical Recipes in C: the Art of Scientific Computing* (2nd ed.), Cambridge: Cambridge Univ. Press, Chapter 10 (1999).

Foley et al., *Computer Graphics: Principles and Practice* (2nd ed), Addison–Wesley (1996).

Maintz et al., "A survey of medical image registration," *Medical Image Analysis*, vol. 2(1), pp. 1–36 (1998).

Van den Elsen et al., "Medical image matching—a review with classification," *IEEE Eng. Med. Biol.*, vol. 12, pp. 26–39 (Mar. 1993).

Maurer et al., "A review of medical image registration," in R.J. Maciunas, Ed., *Interactive Image–Guided Neurosurgery*, Parkridge, IL: Amer. Assoc. Neurological Surgeons, pp. 17–44 (1993).

Brown, "A survey of image registration techniques," *ACM Computing Surveys*, vol. 24(4), pp. 325–376 (Dec. 1992).

West et al., "Comparison and evaluation of retrospective intermodality brain image registration techniques," *J. Computer Assisted Tomography*, vol. 21, pp. 554–566 (1997).

Fitzpatrick et al., "Visual Assessment of the accuracy of retrospective registration of MR and CT images of the brain," *IEEE Trans. Med. Imag.*, vol. 17(4), pp. 571–585 (Aug. 1998).

Chen, et al., "Three Dimensional Image Registration Based on Parameter Accumulation", Signal Processing Theories & Applications, Brussels, Aug. 24–27, 1992 Proceed. Conf. (EUSIPCO), Amsterdam, Elsevier, NL vol. 3, Conf. 6, Aug. 24, 1992, pp. 1437–1440 (XP000356512).

Liang, et al., "Automated Registration of Multimodality Images by Maximization of a Region Similarity Measure", Image Processing, 1997, Proceed. Int'l. Conf. on Santa Barbara, CA US Oct. 26–29, 1997, Los Alamitos, CA IEEE Comput. Soc. US Oct. 26, 1997, pp. 272–275 (XP010253791).

Thevenaz, et al. "Iterative Multi–Scale Registration Without Landmarks", Proceed. Int'l. Conf. on Image Processing (ICIP), Washington Oct. 23–26, 1995 Los Alamitos, IEEE Comp. Soc. Press, US vol. 3, Oct. 23, 1995, pp. 228–231 (XP010197172).

Viola, et al., "Alignment by Maximization of Mutual Information", Int. Journ. of Computer Vision, Kluwer Academic Publ. Norwell, US V. 24, No. 2, Sep. 1, 1997, pp. 137–154 (XP000703579).

Maes, et al., "Multimodality Image Registration by Maximization of Mutual Information", IEEE Trans. on Med. Imaging, IEEE, NY US V. 16, No. 2, Apr. 1, 1997, pp. 187–198 (XP000685807).

* cited by examiner

IMAGING REGISTRATION SYSTEM AND METHOD USING LIKELIHOOD MAXIMIZATION

BACKGROUND OF THE INVENTION

The present invention relates to image processing systems and methods and, more particularly, to image registration systems that combine two or more images into a composite image. The present invention finds particular application in the field of medical imaging, however, it will be appreciated that the present invention is also applicable to other types of imaging systems wherein multiple images are correlated and combined into a composite image.

The term "image," as used herein, refers to a three-dimensional (3D) or volumetric image, unless otherwise indicated. The acquisition of volume images via a variety of imaging modalities is well known in the medical field. Such modalities include, for example, magnetic resonance imaging is (MRI) techniques, x-ray computed tomography (CT), nuclear imaging techniques such as positron emission tomography (PET) and single photon emission computed tomography (SPECT), ultrasound, and so forth. Volume images so acquired are typically stored digitally, e.g., in a computer memory, as arrays of voxel values. Each voxel is associated with a location in 3D space (e.g., x, y, and z coordinates), and is assigned a color value, typically a gray scale intensity value.

Image fusion, or the combination of multiple associated images to form a composite image integrating the data therefrom, is often desirable in a clinical setting. In many cases, combined images might provide insights to the diagnostician that could not be obtained by viewing the images separately. Multi-modality image fusion is often useful since different imaging modalities provide information that tends to be complimentary in nature. For example, computed tomography (CT) and magnetic resonance (MR) imaging primarily provide anatomic or structural information while single photon emission computed tomography (SPECT) and positron emission tomography (PET) provide functional and metabolic information. The combination of a functional or metabolic image with a structural or anatomical image aids in localizing the functional image, thus improving diagnostic accuracy. For example, in the area of oncology, precise positioning of localization of functional images enables a clinician to assess lesion progression and/or treatment effectiveness. Also, such diagnostic studies are used in surgical and/or radiotherapeutic planning, where precise positioning is necessary to minimize the effect on healthy cells surrounding the target cells. It is also desirable at times to combine images from the same modality. For example, it may be desirable to combine the results of multiple MR scans, such as an MR angiograph, a contrast-enhanced MR image, or a functional MRI (fMRI) image, with another MR image, such as an anatomical MR image.

For the meaningful integration of data from multiple images, it is important that the images be properly registered. Image registration involves bringing the images into spatial alignment such that they are unambiguously linked together. A number of image registration techniques are known in the art.

One image registration technique requires that an individual with expertise in the structure of the object represented in the images label a set of landmarks in each of the images that are to be registered. The two images are then registered by relying on a known relationship among the landmarks in the two images. One limitation of this approach to image registration is that the registration accuracy depends on the number and location of landmarks selected. Selecting too few landmarks may result in an inaccurate registration. Selecting too many landmarks does not necessarily guarantee accurate registration, but it does increase the computational complexity of registration. Also, the manual operations required are time consuming. Furthermore, it is not always possible to identify appropriate structural landmarks in all images.

Recently, two different imaging modalities have been combined in a single imaging device. This integrated hardware approach to image registration is a less than optimal solution to the problem of image registration due to cost and logistical reasons. In many cases, hardware registration is impractical or impossible and one must rely on software-based registration techniques. For example, such a hardware approach is not applicable to the registration of images acquired at different times or from different subjects, e.g., when monitoring treatment effectiveness over time, or for applications involving inter-subject or atlas comparisons. Software registration would also be necessary in some cases, even if a hardware-based approach to registration is used. For example, software registration would be needed for the correction of motion that occurs between sequential scans taken on the same machine, such as transmission and emission scans in PET and SPECT, and for the positioning of patients with respect to previously determined treatment plans.

In recent years, full volume-based registration algorithms have become popular since they do not rely on data reduction, require no segmentation, and involve little or no user interaction. More importantly, they can be fully automated and provide quantitative assessment of registration results. Entropy-based algorithms, the mutual information approach in particular, are among the most prominent of the full volume-based registration algorithms. Most of these algorithms optimize some objective function that relates the image data from two modalities. These entropy or mutual information techniques are bounded in one direction, but unbounded in the other. For example, mutual information has a lower bound of 0, but the upper bound is implementation dependent, e.g., the number of bins. Likewise, entropy has a lower bound 0 and the upper bound is also implementation dependent. As a result, the degree to which the images are successfully registered is difficult to understand.

Accordingly, the present invention contemplates a new and improved image processing system and method which overcome the above-referenced problems and others.

SUMMARY OF THE INVENTION

In accordance with a first aspect, the present invention provides a method for registering first and second volumetric images comprising three-dimensional arrays of gray scale voxel values. Mutation probabilities are defined for a plurality of aligned pairs of voxel values comprising a voxel value from the first image and a spatially corresponding voxel value from the second image. The mutation probabilities can be obtained from previous statistics on registered images or calculated purely from the current data set. Each mutation probability is related to the likelihood that a voxel value in one image corresponds to a spatially corresponding voxel value in the other image and is based on a selected geometric relationship of the images. A first transform defining a geometric relationship of the second image relative to the first image is selected and a measure of the likelihood for a predetermined set of aligned voxel pairs using the mutation probabilities is calculated, the measure of the likelihood being an indicium of the probability of obtaining the first image given the second image and the probability of obtaining the second image given the first image. A different transform defining a geometric relationship of the second image relative to the first image is selected and the process is repeated in iterative fashion until an optimal transform providing an optimal measure of the likelihood is calculated.

In accordance with another aspect, an article of manufacture is provided comprising a computer useable medium having computer readable code means embodied therein for performing the method of the present invention.

In accordance with another aspect of the present invention, an image processing system for registering first and second volumetric images includes a registration processor and associated memory for storing a plurality of volumetric image representations to be registered, a memory coupled to the registration processor for storing parameters representative of the optimal transform, and a display system for forming a composite image representation of the first and second images. Specifically, the registration processor defines, based on a selected geometric relationship of the images, mutation probabilities for a plurality of aligned pairs of voxel values, each pair comprising a voxel value from the first image and a spatially corresponding voxel value from the second image. The mutation probabilities are related to the likelihood that a voxel value in the first image corresponds to a spatially corresponding voxel value in the second image. The registration processor also selects a first transform defining a geometric relationship of the second image relative to the first image and calculates a measure of the likelihood for a predetermined set of aligned voxel pairs using the mutation probabilities, the measure of the likelihood being an indicium of the probability of obtaining probability of obtaining the first image given the second image and vice versa. The registration processor selects a different transform and iteratively repeats the process until an optimal transform providing an optimal measure of the likelihood is calculated.

In accordance with yet another aspect of the present invention, a method for imparting information to a user of an image processing system is provided, the method steps including providing first and second volumetric images and defining, based on a selected geometric relationship of the images, mutation probabilities for a plurality of aligned pairs of the voxel values, the pairs comprising a voxel value from the first image and a spatially corresponding voxel value from the second image, and the mutation probabilities being related to the likelihood that a voxel value in the first image corresponds to a spatially corresponding voxel value in the second image and that the voxel in the second image corresponds to the spatially corresponding voxel in the first image. A first transform defining a geometric relationship of the second image relative to the first image is selected and a measure of the likelihood for a predetermined set of aligned voxel pairs using the mutation probabilities is calculated, the measure of the likelihood being an indicium of the probability of obtaining probability of obtaining the first image given the second image and vice versa. A different transform defining a geometric relationship of the second image relative to the first image is selected and the process is repeated in iterative fashion until an optimal transform providing an optimal measure of the likelihood is calculated. The first and second images are registered using the optimal transform, and the normalized measure is output.

One advantage of the present invention is that it does not use data reduction and requires no segmentation or user interactions.

One advantage of the present invention is that it provides a registration method based on a probability interpretation that is easy to understand.

Another advantage of the present invention is that the registration is symmetric, i.e., rather than registering a first image to a second image, or vice versa, the two images are registered to each other.

Another advantage of the invention is that it can also easily incorporate segmentation whereby the probabilistic relation can be estimated using a subset of the volume data, the subset being based on, for example, spatial segmentation of the volume or on voxel-value based segmentation. By emphasizing the importance of a subset of the volume, one would expect a better registration result in some cases. This flexibility is typically not available in prior art full volume-based methods.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Generally, the voxel values in two registered images are probability related, regardless of whether they are from the same modality or are from different modalities. This probabilitic relation can be obtained based on previous experimental observation, or can be estimated solely on the volume data in a self-consistent way. Based on this probabilitic relation, given one volumetric image, the likelihood of having the other volumetric image is computed. When this likelihood has its maximal value, the two images are considered to be registered. When two volumes are in registration, the normalized maximal likelihood has a probability interpretation that is far less abstract than the prior art mutual information or entropy methods. The calculated likelihood has a lower bound of zero and an upper bound of one.

Figure 1:
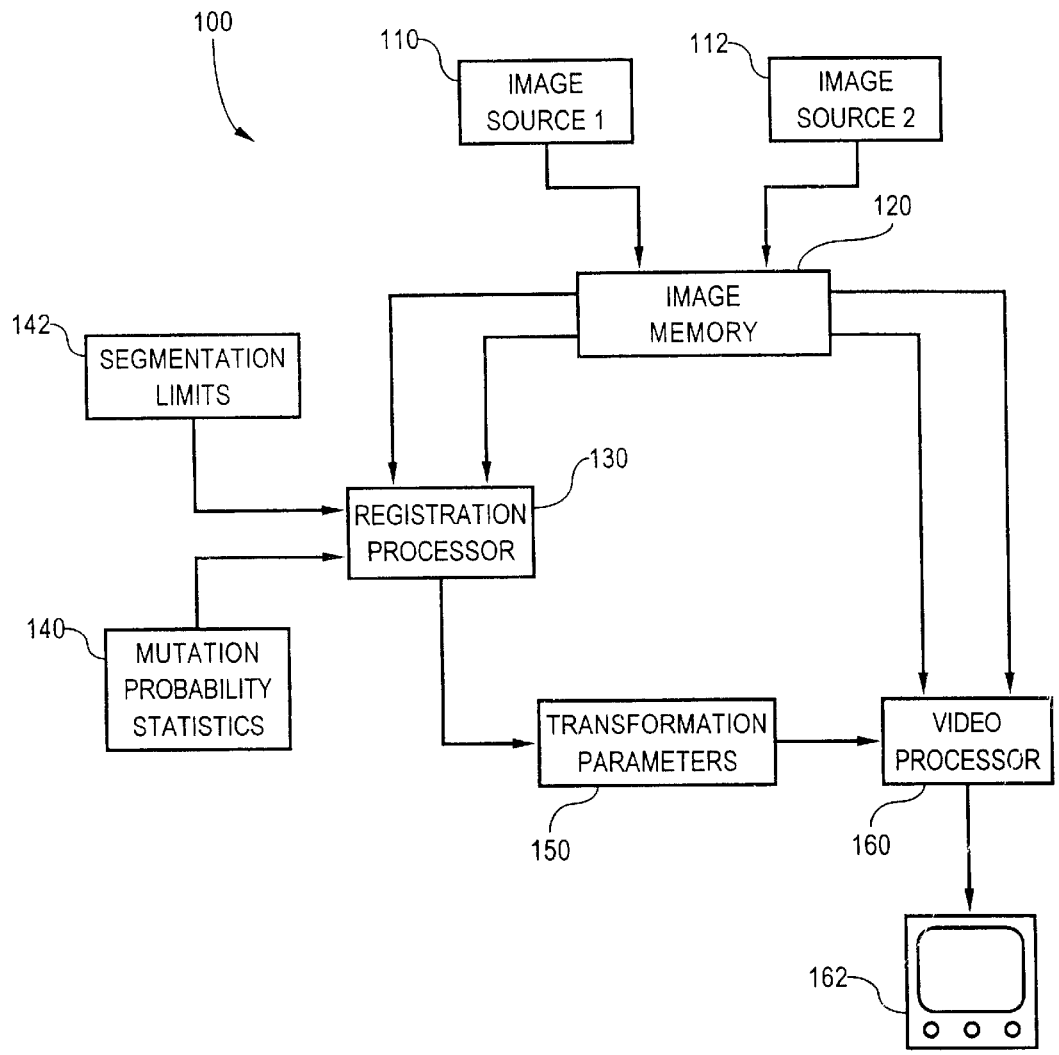
FIG. 1 is a block diagram of an image capture and processing system according to the present invention.

With reference to FIG. 1, an image processing system 100 according to the present invention includes a first image source 110 and a second image source 112 for acquiring and/or storing volumetric image data. The first and second image sources 110 and 112 are preferably medical diagnostic imaging scanners, such as MR scanners, x-ray CT scanners, nuclear cameras (e.g., PET and/or SPECT scanners), ultrasound scanners, and so the like. The first and second image sources 110 and 112 may be of the same or different imaging modality, and may be obtained from different scanning hardware or from the same hardware. For example, the first and second image sources 110 and 112 can be a single apparatus including plural imaging modes. Also, the first and second image sources 110 and 112 can be a single apparatus wherein plural images are acquired at different times.

In certain embodiments, both the first and second image sources 110 and 112 include sensors, data acquisition circuitry, and image reconstruction circuitry as appropriate for generating the images to be registered, as is well known to those skilled in the art pertaining to diagnostic imaging. However, in other contemplated embodiments, one or both of the image sources 110 and 112 may be a previously acquired image, for example, an image representation that has been saved in an electronic memory or computer readable storage medium, such as computer memory, random access memory (RAM), disk storage, tape storage, or other magnetic or optical medium, at a storage location on a computer network, or the like. Thus, although the image processing system of the present invention may be interfaced directly to the scanning hardware that acquired one or both of the images to be registered, it is not necessary that it is so.

The image processing system 100 further includes an image memory 120 for storing image data from the image sources 110 and 112. A registration processor 130 reads the two volume images from the image memory 120 and registers the images using a likelihood maximization algorithm to produce a registration transformation matrix relating the two images.

Briefly, "likelihood" as used herein refers to a probability relation, namely, the probability that given image f, one has image g and given image g, one has image f. This likelihood can be calculated for a plurality of registration or transformation parameters and iteratively optimized to determine registration parameters providing the maximum likelihood. COnventional optimization techniques are used, including, for example, those described by Press et al., *Numerical Recipies in C: The Art of Scientific Computing* (2nd ed.), Cambridge: Cambridge Univ. Press, 1999, Chapter 10. The optimized registration transformation matrix is stored in a memory 150.

In certain embodiments, a knowledge based implementation is used, wherein an optional memory 140 is provided for storage of mutation probabilities between the voxel pairs for the images involved. The mutation probability statistics are based on previous experience, e.g., a prior registration of the two images, and are used for calculating the likelihood. One can change the relative orientation and position of the two images, and based on the voxel pairs, compute the likelihood. By iterative optimization of the likelihood, e.g., using the conventional optimization techniques, an optimal registration for the two images is determined.

In other embodiments, a self-consistent implementation is used, wherein prior knowledge of the mutation probabilities is not required. Under this approach, the current registration is used to estimate the mutation probability, and this estimate is used to calculate the likelihood. One can change the relative orientation and position of the two images, and based on the gray scale pairs, calculate a new estimate for the mutation probabilities and compute the likelihood. By iterative optimization of the likelihood, again using the conventional optimization techniques, an optimal registration can be determined.

Optionally, segmentation limitations, for example, as may be input by a user, are also provided. The segmentation limits serve to limit the likelihood calculation to selected voxels. The voxels may be limited to, for example, one or more subvolumes within the involved images, or voxels within a certain range of voxel intensity values. Segmentation based on other voxel characteristics is contemplated as well.

The registration transformation matrix, so determined, is used by a display or video processor 160 to align the two images read from the image memory 120 and display them on computer or other human-readable display 162 as a composite image as prescribed by the registration transformation matrix. Standard data processing and programming techniques are used to store images and associate matrices, as well as previous mutation probability statistics or segmentation limits, with the appropriate images, such as indexing, the use of pointers, and the like.

As an alternative to or in addition to storing the transformation matrix, once the optimal registration is determined, a composite image formed from the two images can be stored. However, it is generally preferred to store the transformation matrix. Also, one image can be reformatted in the space of another image based on the registration parameters and then stored.

Image registration for purposes other than image fusion is also contemplated. For example, image registration in accordance with this teaching may be performed for multiple partially overlapping images for the purpose of generating a single larger volume image therefrom.

In certain embodiments, the registration processor 130 and the display processor 160 are implemented in software on a conventional computer coupled to a conventional display.

Figure 2:
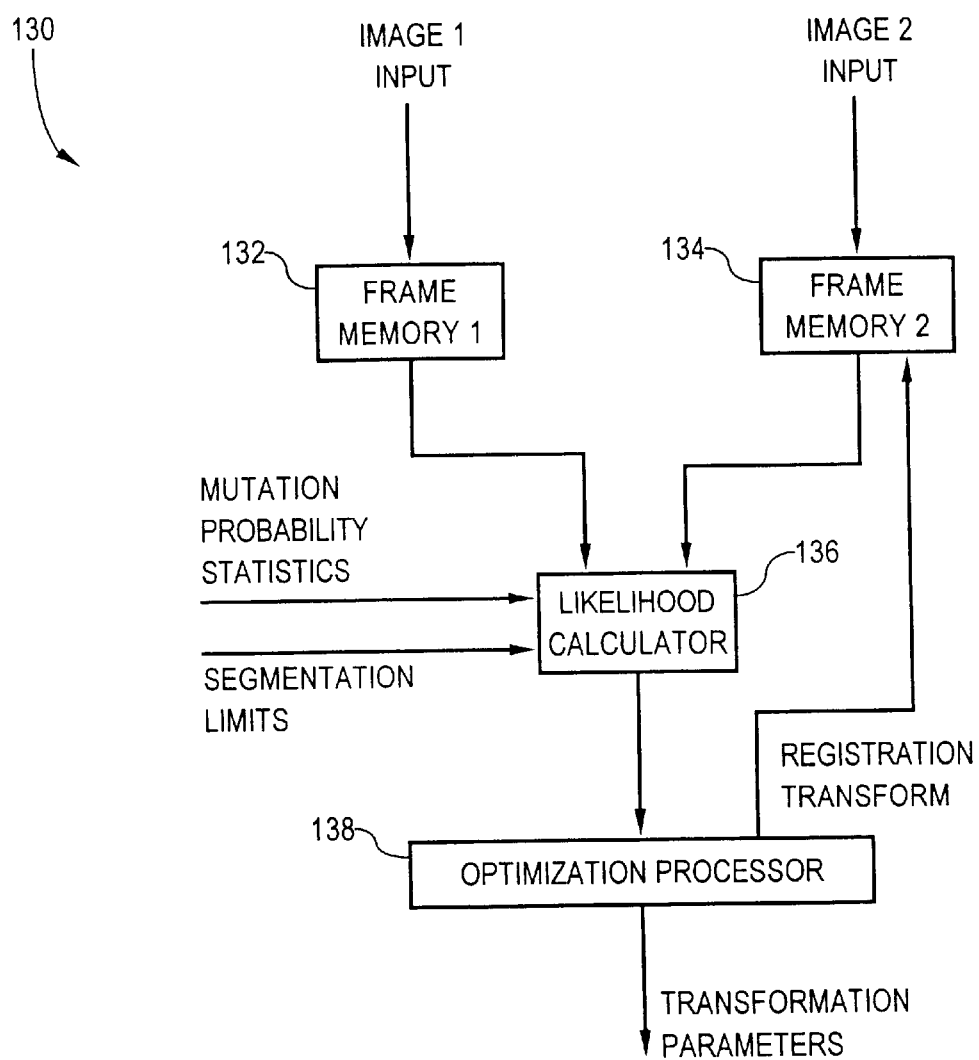
FIG. 2 is a block diagram illustrating the various modules of a software implementation of a volume image registration program according to the present invention.

Referring now to FIG. 2, a module diagram of the registration processor 130 is illustrated. As shown in FIG. 1, the inputs to the registration processor 130 are the first and second images 110 and 112 to be registered. In the case of the knowledge-based implementation, mutation probability statistics 140 are input. Also, segmentation limits 142, if any, are input. The output of registration processor 130 is a set of registration parameters 150, i.e., the elements of a transformation matrix which, when applied to one of the images, will transform that image relative to some fixed coordinate system to bring the two images into alignment.

The registration processor 130 includes frame memories 132 and 134, a likelihood calculator 136 and an optimization processor 138. The likelihood calculator 136 and optimization processor 138 can be modules of an integrated processing system or, alternatively, can be distributed over multiple processors to obtain the benefits of parallel processing. In operation, the registration processor 130 reads two images into the frame memories 132 and 134 and calculates a likelihood value for the current registration. The optimization processor 138 then transforms the image in the frame memory 134 and the likelihood is again calculated by the likelihood calculator 136. The likelihood calculation process is detailed below in conjunction with FIG. 3. The steps are iteratively repeated until the likelihood value calculated by the likelihood calculator 136 is optimized. The transformation parameters are output to the memory 150, or displayed to a user.

If segmentation limits are input, only the voxels of interest, e.g., voxels within one or more specified subvolumes, and/or having a voxel value within a prespecified range of values, are used to calculate the likelihood, and voxels outside the specified subvolume(s) or specified range limits are ignored.

Figure 3:
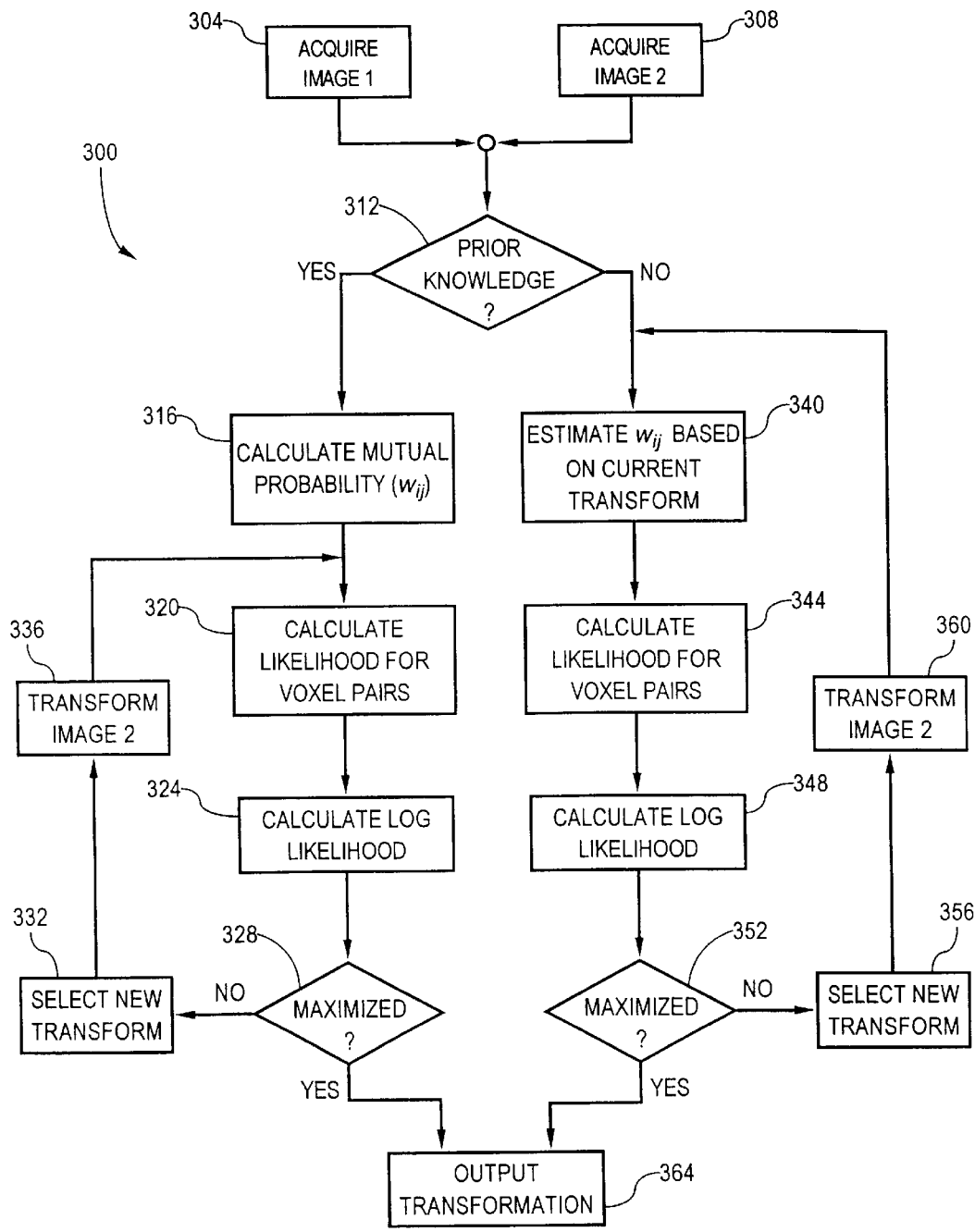
FIG. 3 is a flow chart of an image registration process according to the present invention.

FIG. 3 illustrates an exemplary process 300 for combining two images. The process 300 may be implemented in software as part of an integrated scanner/image processing system, or in a separate image processing system implemented on a standalone computer such as a personal computer, work station, or other type of information handling system. Although the process is described primarily in reference to combining two images, the process can readily be adapted to combining more than two images, for example, by repeating the process in accordance with this teaching serially until all of the images are registered.

Two images to be registered are initially acquired (steps 304 and 308). Again, the images may be of the same or different modality. A value for the likelihood is then calculated as follows. Assume two images f(x, y, z) and g(x, y, z) with gray scales $(u_1, u_2, \ldots, u_n)$ and $(v_1, v_2, \ldots, v_m)$. The frequencies for these gray scales are $(P_1, P_2, \ldots, p_n)$ and $(q_1, q_2, \ldots, q_m)$, respectively. Then, $$\sum_{i=1}^{n} p_i = \sum_{j=1}^{m} q_j = 1.$$

In a single modality case due to noise or changes in the imaged object itself, or in a multi-modality case due to the intrinsic properties of the different modalities, a gray scale value $u_i$ in image f can correspond to gray scale value $v_j$ in image g, j=1, 2, ..., m. No concrete relationship is assumed between the voxel values in different modality images, nor are any constraints imposed on the image content of the modalities involved. Rather, their relationship is described on a purely statistical basis that could be knowledge-based or estimated solely from the involved data in a self-consistent way.

Let the mutation probability for a voxel $u_i$ to $v_j$ be $W_{ij}$. Then, $$\sum_{j=1}^{m} w_{ij} = 1.$$

Then, p and q are related by $$q_j = \sum_{i=1}^{n} p_i w_{ij}.$$

Also, $$\sum_{j=1}^{m} q_j = 1$$

holds.

Given the image f and the mutation probability $w_{ij}$, the conditional likelihood that one has image g is $$L'_{f-g} = \Pi w_{ij},$$

where the product can be calculated using the entire overlapping volume or a subset of this volume (utilizing only selected $(u_i, v_j)$ pairs or $(u_i, v_j)$ pairs from selected regions/volumes. Since $w_{ij} \leq 1$, this product can be very close to zero. To ease the computation, its logarithmic value is preferably used instead. The logarithmic likelihood is $$LL'_{f-g} = \Sigma \log w_{ij}.$$

Note that the logarithmic likelihood has a maximum value under some condition if and only if the likelihood has a maximum value under the same condition. The above-defined logarithmic likelihood depends on the number of gray value pairs. To avoid this dependence, a normalized logarithmic likelihood is preferably used:

$$LL_{f-g} = \frac{1}{N} LL'_{f-g} = \frac{1}{N} \Sigma \log w_{ij},$$

where N is the number of gray value pairs. N is the total overlapping volume in number of voxels if all pairs in the overlapping volume are used to calculate the log likelihood.

Considering the voxel mutation from g to f, one has $LL_{g-f}$. Adding these two pieces of logarithmic likelihood together (i.e., multiplication of likelihood) gives $$LL = LL_{f-g} + LL_{g-f}$$

To find an optimal image registration, an optimization algorithm that calculates the likelihood for a plurality of orientations in iterative fashion is used to find a transformation that produces a maximum logarithmic likelihood as defined above.

It is worth noting that adding two pieces of logarithmic likelihood together makes the image registration symmetric with respect to the two involved images, i.e., the order of the two images does not matter. Furthermore, adding the logarithmic likelihood also increases the capture range of the objective function. If one piece has a local maximum value at a particular position, and the other piece does not have a local maximum value at the same position, the optimization process will not be trapped at that location.

If two volume images are registered, the normalized likelihood has a probability interpretation. The normalized likelihood is the average chance that a voxel in the first image corresponds to the voxel in the second image and that a voxel in the second image corresponds to the voxel in the first image. Since the likelihood is in essence a probability, its value is within the range from 0 to 1, and the upper bound for the logarithmic likelihood is 0. By looking at the optimized likelihood, one has a quantitative estimate of the registration quality. If an image is registered to itself, the normalized likelihood is 1. With this in mind, one would then expect that intra-modality registration would result in a higher (closer to 1) normalized likelihood than in cases of inter-modality registration.

As discussed above, the likelihood calculation requires knowledge of the mutation probability $w_{ij}$ for a voxel value in one image to a voxel value in another image. This value can be derived in two ways. The first implementation is knowledge-based, i.e., based on some previous knowledge of the mutation probabilities. The second implementation is a self-consistent approach and does not require any previous knowledge. In step 312, it is determined if there exists any prior knowledge of the mutation probability statistics for the involved images that is desired to be used for the likelihood calculation. If prior knowledge does exist, the process proceeds to step 316 (knowledge-based approach). If prior knowledge does not exist, the process proceeds to step 340 (self-consistent approach).

In step 316, based on previous experience, one may have the statistics on the mutation probabilities, or a probability density function, between the gray scale pairs $(u_i, v_j)$, i=1, 2, ..., n; j=1, 2, ..., m. The voxel pairs of interest are scanned and, based on the gray scale pairs $(u_i, v_j)$ and the known mutation probabilities, the likelihood for each voxel pair is computed in step 320. In step 324, the logarithmic likelihood is computed as described above. The logarithmic likelihood is calculated for a plurality of different registrations until the logarithmic likelihood is maximized and thus, an optimal registration of the two images is found. Specifically, an optimization algorithm is used in step 328 to determine whether the current registration yields a maximum value for the logarithmic likelihood. If the likelihood is not yet maximized, a new transform is selected (step 332) and the relative orientation and position of the two images is changed (step 336) in accordance with the optimization algorithm and the process returns to step 320. The process continues until it is determined that the logarithmic likelihood has been maximized (step 328). Once the logarithmic likelihood has been maximized, thus indicating that an optimal registration has been found, the transformation parameters for the registration transformation yielding the maximized likelihood are output (step 364).

If prior knowledge of the mutation probability is not available (step 312), the process proceeds to step 340 and the likelihood maximization process of the present invention is implemented in a self-consistent fashion. The term "self-consistent" is used since the overlapping volume produced by the current registration is used to estimate the mutation probability which is then used to calculate the likelihood. The optimized likelihood then yields the optimum registration.

Under the current registration of the two images, the mutation probabilities can be estimated (step 340) as follows. The gray value pairs $(u_i, v_j)$ are checked over the whole overlapping volume. Where there are $N_i$ pairs $(u_i, v_j)$, $j=1, 2, \ldots, m$, among which are $N_{ij}$ pairs for $(u_i, v_j)$, an estimated mutation probability $w_{ij}$ is estimated as:

$$w_{ij} = \frac{N_{ij}}{N_i}$$

Again, the likelihood is calculated over the whole overlapping volume or, alternatively, some subset thereof. If the log likelihood is computed over the whole overlapping volume, substituting this estimation of $w_{ij}$ into the normalized log likelihood gives $$LL'_{f-g} = \Sigma \log w_{ij}$$

$$= \frac{1}{N} \sum_i \sum_j N_i w_{ij} \log w_{ij}$$

$$= \sum_i \sum_j p_i w_{ij} \log w_{ij}$$

$$= \sum_i \sum_j h_{ij} \log w_{ij}$$

$$= \sum_i \sum_j h_{ij} \log h_{ij} - \sum_i p_i \log p_i$$

where $p_i = N_i/N$ and $p_i w_{ij} = h_{ij}$ are used and $h_{ij}$ is the estimation of the joint probability. Note that this is the negated conditional entropy H(f|g).

Similarly, one has $$LL_{g-f} = \sum_i \sum_j h_{ij} \log h_{ij} - \sum_j g_j \log q_j$$

and, finally, $$LL = 2 \sum_i \sum_j h_{ij} \log h_{ij} - \sum_j q_j \log q_j - \sum_i p_i \log p_i.$$

In operation, the voxel pairs of interest are scanned and, based on the gray scale pairs $(u_i, v_j)$, and the estimated mutation probabilities, the likelihood for each voxel pair is computed in step 344. In step 348, the logarithmic likelihood is computed as described above. Note that if the likelihood over all of the overlapping voxels is calculated, the computation can be simplified by looping through the joint and marginal histograms, as the previous formula on LL shows. The logarithmic likelihood is calculated for a plurality of different registrations in iterative fashion, with a new estimated mutation probability being calculated for each new registration. For each registration, an optimization algorithm determines (step 352) whether the current registration yields a maximum value for the logarithmic likelihood. If the likelihood is not yet maximized, a new transform is selected (step 356) and the relative orientation and position of the two images is changed (step 360) in accordance with the optimization algorithm and the process returns to step 340. The process continues in iterative fashion until it is determined (step 352) that the logarithmic likelihood has been maximized. Once the logarithmic likelihood has been maximized, thus indicating that an optimal registration has been found, the transformation parameters for the registration transformation yielding the maximized likelihood are output (step 364).

In both the knowledge-based and self-consistent implementations, the calculated maximized likelihood itself is optionally output, e.g., to a display monitor (step 364). Since the calculated value will be a number with an upper bound of 1 (e.g., as would be the case for an image registered with itself or for two images otherwise having an exact one-to-one correspondence), the value can provide a meaningful indicium to the operator of how well the images are registered to each other. This is unlike the prior art entropy-based or mutual information based techniques which result in an unbounded value.

Again, in both the knowledge-based and self-consistent implementations, it is not necessary to calculate the likelihood over the whole overlapping volume. In some embodiments, the likelihood can be calculated over a pre-selected set of points or a portion of the overlapping volume which may be segmented. The emphasis can also be placed on the voxel values, for example, the voxels whose values are in a specific range, such as the upper 50%, the upper 25%, the upper 15%, and so forth. By emphasizing specific segments, improved registration accuracy can be obtained.

EMPIRICAL TESTS

The accuracy and robustness of the likelihood maximization image registration method of the present invention has been demonstrated in the following tests. In particular, the self-consistent implementation was used wherein all the gray value pairs in the overlapping volume were used to estimate the mutation probability and to calculate the log likelihood.

In these examples, rigid-body transformations are used, however, more general transformations are also contemplated, including, for example, nonlinear transformations, affine transformations, warping transformations, and so forth. For a rigid-body transformation, the registration parameter is a six-dimensional vector, $(\theta_x, \theta_y, \theta_z, t_x, t_y, t_z)$, where $\theta_x$, $\theta_y$, and $\theta_z$ are rotation angles in degrees around the x-, y-, and z-axes, respectively, and $t_x$, $t_y$, and $t_z$ are translational offset in millimeters along the x-, y-, and z-axes, respectively. For each rotation, there is a corresponding 4×4 matrix in a homogeneous coordinate system. A successive application of the rotation amounts to matrix multiplication. Since the matrix multiplication is not commutative, the order of these rotations is important. It is assumed herein that the rotations are applied around the x, y, and z-axes, in that order. It is also assumed that the rotation is applied before the translation.

In the self-consistent implementation, one estimates the marginal and joint distribution of gray value pairs in the overlapping volume. The maximum voxel value of image f is first found. The voxel values in image f are then divided into $n_f$ discrete levels. Similarly, the voxel values in image g are divided into $n_g$ discrete values. Here, $n_f$ and $n_g$ can be different. In the overlapping volume, the histograms of voxel values in images f and g, and the voxel pairs are calculated by binning the voxel values and value pairs. The number of bins of the histogram for f is $n_f$, the number of bins of the histogram for g is $n_g$, and the number of bins of the joint histogram is $n_f \times n_g$. These numbers of bins can be fixed or dynamically changed, as discussed below. The normalized histograms then give the marginal as well as the joint distributions.

After a transformation is applied, a grid point in one volume will typically not coincide with another grid point in the transformed space. Before binning the voxel values and voxel value pairs, interpolation is needed in order to obtain the voxel value at the grid in the transformed space. There are a number of different interpolation methods, for example, nearest neighbor, tri-linear, and tri-linear partial volume distribution. Since it is insensitive to the translation up to one voxel, the nearest neighbor interpolation is not sufficient where sub-voxel accuracy is desired. For simplicity the tri-linear interpolation is preferred.

Under a transformation, a multidimensional direction set optimization is used to minimize the negated log likelihood (maximize the likelihood). The direction matrix is initialized to a unitary matrix. The vector is $(\theta_x, \theta_y, \theta_z, t_x, t_y, t_z)$, as explained above. A different order of these registration parameters is possible which may improve the optimization speed. No attempt is made to optimize the parameter order since the order may be image content dependent and an exhaustive trial seems impractical (there are 6!=720 different combinations, although one may try just a subset of them). Furthermore, the optimization may use six other independent directions which do not necessarily correspond to the six directions one intended as the search proceeds.

To find a true global optimal value, simulated annealing can be exploited. Simulated annealing has been successfully applied to 2-dimensional image registration. It is a stochastic method and is slow, which limits its application to 3-dimensional image registration. In practice, the multiresolution or subsampling approach proves to be helpful. It is a robust algorithm that can improve the optimization speed and increase the capture range.

The multiresolution optimization is preferred in this implementation. The images are folded down to an 8×8×8 image as the most coarse image. The resolutions of the successive images are doubled until the full image resolution is reached in all three dimensions. When the volume is large, such as 512×512×512, the computation is demanding and the registration is slow. In some cases the full resolution images are not used. To obtain the low-resolution images, the voxel values within a sampling volume are averaged. Although it is a little slower than the subsampling approach, in practice it gives a better registration result.

When estimating the joint 2-dimensional histogram, the gray values are paired to different bins. Since the joint distribution is estimated by the normalized 2-dimensional histogram, from a statistical point of view, a large sample size is desired. In the multi-resolution optimization strategy, when low resolution images are used however, the number of gray value pairs is small. One would expect that the statistical bias is large.

Suppose the image size is 8×8×8. Then there are at most 512 gray value pairs (when all voxels overlap). For 8-bit gray data, the number of bins can be as large as 256. 256 bins is not good since, on average, there are at most 2 pairs in each bin. The statistical error in the joint probability would render a poor result. In this situation, a smaller number of bins is desirable.

If the number of bins is fixed at a small value, in the case of fine images, there are enough gray value pairs in each bin. One can have a better estimation of the joint probability at the expense of lower sensitivity. This paradox suggests that a fixed number of bins is not ideal and an adaptive number of bins, i.e., the number of bins changes with the resolution, is better.

In tests, an adaptive number of bins was used. Larger numbers of bins tend to slow down the registration process, and the maximum number of bins used was 128. The adaptive number of bins as a function of resolution is tabulated in TABLE 1, where the resolution is given in the maximum number of pixels in three directions.

TABLE 1

Adaptive number of bins as a function of resolution.

| Resolution | 8 | 16 | 32 | 64 | ≧128 |
|---|---|---|---|---|---|
| Number of Bins | 8 | 16 | 32 | 64 | 128 |

The likelihood maximization image registration method in accordance with the present technique was evaluated as follows. A SPECT and a MR data set were used as test volumes. The SPECT image and the MR images were self-registered after various misregistrations were introduced, with and without the presence of noise in the voxel values. Then, the SPECT volume was registered to the MR volume. The registration results are assessed.

The image data consisted of slices. The x-axis was directed horizontally from right to left, the y-axis horizontally from front to back, and the z-axis vertically from bottom to top. Technetium-99m hexamethyl-propyleneamine-oxime (HMPAO Tc-99m) was used as the pharmaceutical for the SPECT image acquisition. The image had a size of 64×64×24 voxels with a voxel size of 7.12×7.12×7.12 mm$^3$. The minimum voxel gray value is 0 and the maximum voxel value is 5425. The average voxel gray value is 163.8.

The MR image (T1 sagittal) had 256×256×128 voxels, with a voxel size of 1.0×1.0×1.5 mm$^3$. The minimum voxel value is 0 and the maximum voxel value is 504, with an average voxel value of 57.8.

First, an image was registered to itself, from various starting misregistrations. To assess the robustness against noise, one image was corrupted by different levels of noise and the registration was done on the same set of randomly generated misregistrations.

To generate randomly misregistered image pairs, an image was first rotated around the x-axis by an angle, then by the y-axis by another angle, and by the z-axis by yet another angle. These angles have a uniform distribution over a certain range. The rotated image was then translated to a new position. The offsets in the x, y, and z directions have a uniform distribution over some range.

White noise was added to the image to generate a corrupted image. The noise follows a Gaussian distribution with a mean value of zero and various standard deviations.

For these experiments with known ground truth, the registration results were then inspected. Inasmuch as a well-trained observer can detect a translational misregistration in the x- and y-axes of 2 mm or more, in the z-axis of 3 mm or more, and a rotational misregistration around the z-axis of 2° or more and around the x- and y-axes of 4° or more, the registration was regarded as a failure if any of the misregistration parameters was beyond these ranges.

A set of 50 randomly misregistered volume pairs were registered. To generate those misregistrations, one image was rotated around the x-, y- and z-axes. Those rotation angles were uniformly distributed over a range of from −20 to 20 degrees. The image was then translated. The translation offsets along the three axes were uniformly distributed over a range of from −56.96 to 56.96 mm.

For the nuclear image without noise, the method in accordance with this technique failed only 10 out of 50 times. For a comparison, those starting misregistered volumes were also registered by mutual information maximization and mean absolute difference minimization techniques. The mutual information approach failed 41 out of 50 times and the mean difference approach failed 4 times out of 50.

For the successful registrations, the average mis-rotations, mis-translations as well as their standard deviations of those registration parameters are calculated and given in TABLE 2. A nuclear image was registered to itself with the presence of noise of different levels, from a set of misregistrations. In each entry, the first number is the average and the second one is the standard deviation. The angles are in degrees, the translations in mm, and the times in seconds. Three algorithms are evaluated: mean absolute difference minimization (AD), mutual information maximization (MI), and likelihood maximization (LH).

The misregistration parameters are defined as the difference between the actual one and the computed one. They all achieved a subvoxel accuracy, with remarkably small bias and deviations. The likelihood maximization method of the present invention is about 25% faster than the mutual information approach. When the images are registered, the calculated likelihood is exactly one, showing the voxel has a one-to-one correspondence.

To assess the robustness of the likelihood maximization method of the present invention, the image was corrupted by additive noise. The registration was done again with the same set of initial misregistrations. The statistics of the misregistration parameters are given in TABLE 2, again for the successful registrations. The Gaussian noise had a variance of 50 and 100, respectively.

It is worth noting that these methods behave well even with the presence of a noise as strong as N(0, 100), although the mean difference will fail if it is not a Gaussian additive noise. The robust behavior is probably due to the strong signal present in the image. Notice that the average gray value is 163.8. When the noise is N(0, 50), the calculated likelihood was 0.762 at registration when the resolution was 64×64×24 and was 0.944 when the resolution was 32×32×24. Similarly, when the noise was N(0, 100), the likelihoods were 0.594 and 0.903, respectively. The voxel range is very large, so each bin can accommodate a relatively large voxel gray value. As a consequence, the noise corrupted voxel may fall into the same bin as the noise-free voxel. That is the reason why the likelihood is large here. When the low resolution image is used, the voxel is smoothed and the number of bins is also decreased, explaining the higher likelihood in lower resolution. The data here also reveals that higher noise reduces the likelihood.

The same experiment was done on the MR image. However, the rotation angles are uniformly distributed over a range of from −30 to 30 degrees and the translational offsets are uniformly distributed over a range of from −24 to 24 mm.

The MR volume has 256×256×128 voxels. As mentioned earlier, if the full resolution image is used, the registration speed is slow (approximately 1 hr). Thus, the maximum resolution used is 64×64×64. It turns out that it works quite well as the following data shows.

TABLE 3 shows the statistics of the misregistration parameters for successful registrations for registration of the MR image to itself with and without the presence of noise

TABLE 2

Statistics of the misregistration parameters for successful registration (nuclear medicine images).

| Algorithm | $\theta_x(10^{-2})$ | $\theta_y(10^{-2})$ | $\theta_z(10^{-2})$ | $t_x(10^{-2})$ | $t_y(10^{-2})$ | $t_z(10^{-2})$ | Time | Success |
|---|---|---|---|---|---|---|---|---|
| N(0,0) | | | | | | | | |
| AD | 0.0 ± 2.4 | −1.3 ± 2.4 | −4.2 ± 3.0 | −3.9 ± 2.9 | −2.9 ± 2.2 | −2.0 ± 2.1 | 77.0 ± 17.7 | 92% |
| MI | −0.6 ± 1.8 | −0.4 ± 2.9 | −0.6 ± 4.4 | −0.0 ± 3.6 | −0.0 ± 2.1 | −6.4 ± 2.1 | 80.9 ± 27.1 | 18% |
| LH | −0.4 ± 2.3 | −2.5 ± 1.9 | −3.5 ± 3.2 | −4.2 ± 3.0 | −3.8 ± 3.1 | −3.5 ± 2.4 | 62.3 ± 13.1 | 80% |
| N(0,50) | | | | | | | | |
| AD | 1.9 ± 3.5 | −0.5 ± 2.5 | −3.8 ± 3.2 | −0.8 ± 3.6 | −3.1 ± 2.8 | 8.0 ± 4.2 | 76.7 ± 12.7 | 86% |
| MI | −0.1 ± 2.4 | 1.0 ± 4.4 | −2.2 ± 9.3 | −6.7 ± 1.7 | −2.1 ± 2.3 | −10.6 ± 3.0 | 82.0 ± 23.5 | 16% |
| LH | 0.8 ± 3.5 | −0.5 ± 2.5 | −3.1 ± 3.1 | −1.1 ± 3.5 | −1.8 ± 3.8 | 9.3 ± 4.0 | 69.1 ± 12.1 | 78% |
| N(0,100) | | | | | | | | |
| AD | 0.5 ± 4.0 | −4.3 ± 3.1 | −1.3 ± 5.7 | −1.4 ± 5.2 | −4.1 ± 4.7 | 13.1 ± 4.4 | 65.7 ± 12.7 | 90% |
| MI | 1.7 ± 3.3 | 0.4 ± 4.7 | 1.6 ± 1.9 | 0.0 ± 1.9 | −2.3 ± 6.4 | −10.4 ± 3.7 | 59.4 ± 21.0 | 16% |
| LH | 0.6 ± 3.2 | −3.3 ± 2.0 | −2.3 ± 4.0 | −2.5 ± 3.3 | −3.3 ± 3.1 | 13.0 ± 4.4 | 58.2 ± 11.6 | 78% | from a set of misregistrations. In each entry, the first number is the average and the second one is the standard deviation. The angles are in degrees, the translations in mm, and the times in seconds. Three algorithms are evaluated: mean absolute difference minimization (AD), mutual information maximization (MI), and likelihood maximization (LH). The success rates are in the same order although mutual information correctly registered all the image pairs. The effect of resolution on the registration results was not studied since all failed registrations have a large translation offset such that there is no overlapping volume. This situation will not change in the further higher resolution optimization.

the first set of 50 misregistrations (Set 1), the differences between the rotation angles and the standard rotation angles are uniformly distributed over a range of from −20 to 20 degrees and the differences between the translational offsets are uniformly distributed over a range of from −28.48 to 28.48 mm. For the second set of 50 misregistrations (Set 2), the angle differences are distributed uniformly over a range of from −30 to 30 degrees and the translational differences are distributed uniformly over a range of from −28.48 to 28,48 mm. Since the true registration parameters are unknown, a relatively large threshold was set for the differ-

TABLE 3

Statistics of the misregistration parameters for successful registration (MR images).

| Algorithm | $\theta_x(10^{-2})$ | $\theta_y(10^{-2})$ | $\theta_z(10^{-2})$ | $t_x(10^{-2})$ | $t_y(10^{-2})$ | $t_z(10^{-2})$ | Time | Success |
|---|---|---|---|---|---|---|---|---|
| N(0,0) | | | | | | | | |
| AD | −0.5 ± 0.4 | −0.3 ± 0.4 | −0.1 ± 0.5 | −0.7 ± 1.1 | −1.6 ± 0.6 | −1.8 ± 1.2 | 358.4 ± 161.3 | 98% |
| MI | −0.6 ± 0.7 | −0.2 ± 0.4 | 0.0 ± 0.6 | 0.0 ± 0.4 | 0.8 ± 0.7 | −2.2 ± 1.2 | 111.7 ± 16.8 | 100% |
| LH | −0.1 ± 0.8 | −0.7 ± 0.5 | −0.3 ± 0.5 | −0.4 ± 0.7 | −0.8 ± 1.3 | −2.0 ± 1.1 | 174.7 ± 18.3 | 94% |
| N(0,50) | | | | | | | | |
| AD | 0.1 ± 1.5 | −1.9 ± 1.3 | −1.2 ± 2.3 | 2.0 ± 2.4 | −1.3 ± 1.5 | −6.2 ± 1.9 | 220.0 ± 39.9 | 98% |
| MI | −1.0 ± 1.1 | −0.8 ± 0.8 | −0.4 ± 1.5 | −0.1 ± 0.7 | 0.0 ± 0.6 | −2.7 ± 1.0 | 335.6 ± 84.6 | 100% |
| LH | 2.1 ± 1.4 | 0.2 ± 0.5 | 0.9 ± 0.8 | −0.3 ± 0.6 | 0.1 ± 1.0 | 2.5 ± 1.2 | 345.1 ± 83.1 | 94% |

For the noise-free images in registration, the likelihood was one, as expected. For the noised images in registration, when the resolution was 128×128×128, it was 0.082, and when the resolution was 64×64×64, it was 0.248. As in the previous example, the likelihood value increased when the resolution decreased. It is noted that the likelihood here is smaller than that in the previous example since the average voxel gray value is lower here and the influence of the noise is more remarkable.

For the multimodality registration, the correct registration parameters are unknown. Various evaluation methods are ence between the computed one and the standard when judging whether a registration succeeds. The angle threshold is 10 degrees regardless of the rotation axis and the translation threshold is 14.24 mm regardless of the direction.

First, the MR image was used as a reference and the SPECT as a floating image. The statistics of the misregistration parameters for mutual information maximization and likelihood maximization are shown in TABLE 4.

TABLE 4

Statistics of misregistration parameters (MR image used as a reference).

| Algorithm | $\theta_x$ | $\theta_y$ | $\theta_z$ | $t_x$ | $t_y$ | $t_z$ | Time | Success |
|---|---|---|---|---|---|---|---|---|
| Set 1: | | | | | | | | |
| MI | −2.91 ± 0.78 | 4.10 ± 0.38 | −1.88 ± 0.31 | 2.44 ± 0.17 | −0.52 ± 0.75 | −3.67 ± 0.56 | 198.4 ± 45.3 | 100% |
| LH | −0.77 ± 1.16 | 4.07 ± 0.57 | −1.71 ± 0.37 | 2.48 ± 0.29 | −1.80 ± 0.84 | −4.46 ± 0.54 | 185.3 ± 53.0 | 92% |
| Set 2: | | | | | | | | |
| MI | −2.99 ± 0.75 | 4.00 ± 0.41 | −1.84 ± 0.31 | 2.38 ± 0.21 | −0.50 ± 0.65 | −3.60 ± 0.58 | 195.7 ± 40.3 | 98% |
| LH | −0.79 ± 1.66 | 3.98 ± 0.65 | −1.81 ± 0.31 | 2.43 ± 0.28 | −1.82 ± 1.17 | −4.48 ± 0.61 | 176.5 ± 36.6 | 86% | used to assess its accuracy, including phantom validation, observer assessment, fiducial marks, among others. Here, a modified observer assessment approach was used. The MR/SPECT image pair was first registered by a clinical expert using an interactive (manual) registration method which is available in the software. The registration parameters were then used as the standard and the registration results of the likelihood maximization or mutual information maximization were compared against this standard result. To assess the robustness of these techniques, some misregistrations were randomly generated as an initial registration. In The success rate of the mutual information maximization approach was found to be slightly better than the likelihood method of the present invention. As the initial misregistration became larger, the success rate of both methods decreased. Also revealed by the data is that, as the initial misregistration becomes larger, the statistics do not change noticeably, indicating that both methods are robust and reliable.

Both registration results show some systematic difference from the standard one, however, all these differences were subvoxel. The deviation of the mutual information approach is smaller than that of the likelihood approach, indicating the mutual information registration is slightly more consistent, although this difference is marginal.

Although a remarkable difference was not expected when the SPECT image was used as a reference, the experimental results do show some disparity, as shown in TABLE 5.

TABLE 5

Statistics of misregistration parameters (SPECT image used as a reference).

| Algorithm | $\theta_x$ | $\theta_y$ | $\theta_z$ | $t_x$ | $t_y$ | $t_z$ | Time | Success |
|---|---|---|---|---|---|---|---|---|
| Set 1: | | | | | | | | |
| MI | 3.56 ± 2.21 | −3.67 ± 2.31 | 1.11 ± 1.54 | 0.87 ± 1.48 | 2.54 ± 1.47 | 1.40 ± 0.93 | 69.2 ± 14.5 | 98% |
| LH | 2.06 ± 3.12 | −2.74 ± 2.75 | 2.58 ± 2.47 | 0.56 ± 1.83 | 1.67 ± 1.75 | 2.94 ± 1.13 | 63.6 ± 13.2 | 60% |
| Set 2: | | | | | | | | |
| MI | 3.23 ± 2.51 | −3.92 ± 1.85 | 1.08 ± 2.44 | 1.11 ± 1.37 | 2.36 ± 1.45 | 1.63 ± 1.39 | 78.3 ± 13.7 | 88% |
| LH | 2.17 ± 3.40 | −2.99 ± 2.44 | 2.46 ± 2.98 | 0.59 ± 1.72 | 1.41 ± 1.75 | 2.44 ± 1.14 | 73.73 ± 13.8 | 44% |

The success rate of the likelihood approach dropped greatly. The deviation of the registration parameters of these two approaches also increases. In both algorithms the registration results should not depend upon which image is the reference image. This disparity may be implementation related.

In registration, the likelihood was 0.060 when the resolution was 32×32×24 and was 0.024 when the resolution was 64×64×24. While these values may appear small in magnitude, they do indicate a significant likelihood. As discussed below, if there is no relation, one would expect likelihoods of 0.00098 and 0.00024, respectively.

It is noted that, in the self-consistent implementation of the present invention, if the likelihood is calculated over all the overlapping volume, the final formula is composed by the contributions from the entropy and joint entropy. In the derivation, if image f is treated as a random field, $u_i$ would be a random variable. Instead of computing the conditional likelihood, the likelihood can be computed. The formula is then the negated joint entropy. Since the image is given, it is preferable to compute the conditional likelihood. As indicated earlier, one piece of the log likelihood is the negated conditional entropy, but the interpretation is totally different. If partial volume data is used to calculate the likelihood, or the likelihood is calculated based on prior knowledge, the formula would be different and there is no such counterpart in the entropy, conditional entropy, and mutual information approaches.

There are some conceptual difficulties with the entropy approach, however. The concept of entropy was proposed in the 1940's. The conventional use of entropy is to exploit it as an objective function to be maximized, for example, in statistical physics, estimation theory, spectral analysis, image reconstruction, queue theory, and city planning. In the middle of the 1980's, entropy maximization was formally established as a principle based on a set of axioms. However, entropy minimization as a principle has never been formally posed. One can still informally or intuitively justify entropy minimization in the image registration context, but a sound foundation is still missing. Likelihood maximization, however, is an established principle and is easy to understand. Likelihood maximization has a solid theoretical foundation and is conceptually easy to appreciate.

Likelihood is a probability and has a lower bound of 0 and an upper bound of 1. Although the calculation of the likelihood depends on the resolution and also the number of bins, the upper bound of 1 never changes. If the two images have no correlation, then one would expect that the mutation probability for a voxel in f to a voxel in g is $1/n_f$, and the mutation for a voxel in g to a voxel in f is $1/n_g$. The likelihood is then $1/n_f n_g$. By looking at the likelihood, one knows to what extent the two images match. While entropy and mutual information are abstract concepts, likelihood is more readily understood.

There has thus been described an image processing system and method employing image registration using likelihood maximization. In comparison to mutual information maximization and absolute difference minimization methods, the results indicate that the performance of the present invention is comparable to that of the mutual information approach.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory of one or more computer systems. Until required by the computer system, the set of instructions may be stored in another computer readable memory, for example in a hard disk drive or in a removable memory such as an optical disk for utilization in a CD-ROM or DVD drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by a user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically, so that the medium carries computer readable information.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or their equivalents.

Having thus described the preferred embodiments, the invention is now claimed to be:

1. A method for registering a first volumetric image and a second volumetric image, each image comprising a three-dimensional array of gray scale voxel values, the method comprising:

(a) defining mutation probabilities for a plurality of aligned pairs of the voxel values, the aligned pairs of voxel values comprising a voxel value from the first image and a spatially corresponding voxel value from the second image, each mutation probability being related to the likelihood that a voxel value in the first image corresponds to a spatially corresponding voxel value in the second image and vice versa, said defining being based on a selected geometric relationship of the first and second images;

(b) selecting a first transform defining a geometric relationship of the second image relative to the first image;

(c) calculating a measure of the likelihood for a predetermined set of aligned voxel pairs using the mutation probabilities, the measure of the likelihood being an indicium of the probability of obtaining the first image given the second image and vice versa wherein the measure of likelihood has an upper bound of 1;

(d) selecting a different transform defining a geometric relationship of the second image relative to the first image; and (e) iteratively repeating steps (c) and (d) until an optimal transform defining a geometric relationship of the second image relative to the first image is calculated, the optimal transform providing an optimal measure of the likelihood.

2. The method of claim 1, further including the step of storing data representative of the optimal transform.

3. The method of claim 1, further including the step of registering the first and second images using the optimal transform.

4. The method of claim 3, further including the step of displaying a composite image formed from the registered first and second images.

5. The method of claim 1, wherein the optimal transform is selected from a rigid-body transform, an affine transform, a warping transform, and a nonlinear transform.

6. The method of claim 1, wherein the optimal transform is a rigid-body transform.

7. A method for registering a first volumetric image and a second volumetric image, each image comprising a three-dimensional array of voxel values, the method comprising:

(a) accessing stored pre-computed mutation probability values for a plurality of aligned pairs of the voxel values, including the aligned pairs of voxel values comprising a voxel value from the first image and a spatially corresponding voxel value from the second image, each mutation Probability value being related to the likelihood that a voxel value in the first image corresponds to a spatially corresponding voxel value in the second image and vice versa, said defining being based on a selected geometric relationship of the first and second images;

(b) selecting a first transform defining a geometric relationship of the second image relative to the first image;

(c) calculating a measure of the likelihood for a predetermined set of aligned voxel pairs using the mutation probability values, the measure of the likelihood being an indicium of the probability of obtaining the first image given the second image and vice versa;

(d) selecting a different transform defining a geometric relationship of the second image relative to the first image; and (e) iteratively repeating steps (c) and (d) until an optimal transform defining a geometric relationship of the second image relative to the first image is calculated, the optimal transform providing an optimal measure of the likelihood.

8. The method of claim 1, wherein the step of defining mutation probabilities includes estimating mutation probabilities based on a currently selected transform defining a geometric relationship of the second image relative to the first image.

9. The method of claim 1, wherein the plurality of aligned pairs comprises all aligned pairs in overlapping portions of the first and second images.

10. The method of claim 1, wherein the plurality of pairs are limited to one or more selected subvolumes in overlapping portions of the first and second images.

11. A method for registering a first volumetric image and a second volumetric image, each image comprising a three-dimensional array of gray scale voxel values, the method comprising:

(a) defining mutation probabilities for a plurality of aligned pairs of the voxel values, the aligned pairs of voxel values comprising a voxel value from the first image and a spatially corresponding voxel value from the second image, the plurality of pairs being limited to aligned pairs in overlapping portions of the first and second images having voxel values within a preselected range of values, each mutation probability being related to the likelihood that a voxel value in the first image corresponds to a spatially corresponding voxel value in the second image and vice versa, said defining being based on a selected geometric relationship of the first and second images;

(b) selecting a first transform defining a geometric relationship of the second image relative to the first image;

(c) calculating a measure of the likelihood for a predetermined set of aligned voxel pairs using the mutation probabilities, the measure of the likelihood being indicative of the probability of obtaining the first image given the second image and vice versa;

(d) selecting a different transform defining a geometric relationship of the second image relative to the first image; and (e) iteratively repeating steps (c) and (d) until an optimal transform defining a geometric relationship of the second image relative to the first image is calculated, the optimal transform providing an optimal measure of the likelihood.

12. The method of claim 1, wherein the measure of the likelihood is symmetrical.

13. The method of claim 1, wherein the step of calculating the measure of the likelihood includes summing logarithms of the mutation probabilities.

14. A method for registering a first volumetric image and a second volumetric image, each image comprising a three-dimensional array of voxel values, the method comprising:

(a) defining mutation probabilities for a plurality of aligned pairs of the voxel values, the aligned pairs of voxel values comprising a voxel value from the first image and a spatially corresponding voxel value from the second image, each mutation probability being related to the likelihood that a voxel value in the first image corresponds to a spatially corresponding voxel value in the second image and vice versa, said defining being based on a selected geometric relationship of the first and second images;

(b) selecting a first transform defining a geometric relationship of the second image relative to the first image;

(c) calculating a measure of the likelihood for a predetermined set of aligned voxel pairs using the mutation probabilities, the measure of the likelihood being an indicium of the probability of obtaining the first image given the second image and vice versa, calculating the measure of the likelihood including:

calculating, as a sum of logarithms of the mutation probabilities, a first logarithmic likelihood value being an indicium of the probability of obtaining the first image given the second image for the predetermined set of aligned voxel pairs;

calculating, as a sum of logarithms of the mutation probabilities, a second logarithmic likelihood value being an indicium of the probability of obtaining the second image given the first image for the predetermined set of aligned voxel pairs; and adding the first and second logarithmic likelihood values;

(d) selecting a different transform defining a geometric relationship of the second image relative to the first image; and (e) iteratively repeating steps (c) and (d) until an optimal transform defining a geometric relationship of the second image relative to the first image is calculated, the optimal transform providing an optimal measure of the likelihood.

15. An image processing system for registering a first volumetric image and a second volumetric image, the volumetric images comprising three-dimensional arrays of voxel values, comprising a registration processor and associated memory for storing a plurality of volumetric image representations to be registered, the registration processor:

determining mutation probabilities for a plurality of aligned pairs of the voxel values, the aligned pairs of voxel values comprising a voxel value from the first image and a spatially corresponding voxel value from the second image, each mutation probability being related to the likelihood that a voxel value in the first image corresponds to a spatially corresponding voxel value in the second image and vice versa, said defining being based on a selected geometric relationship of the first and second images;

calculating a measure of the likelihood for a plurality of geometric relationships between the first and second images, the measure of likelihood being calculated for a predetermined set of aligned voxel pairs using the mutation probabilities, and the measure of the likelihood being an indicium of the probability of obtaining the first image given the second image and vice versa wherein the measure of likelihood has an upper bound of 1; and optimizing the measure of likelihood to find an optimal transform defining a geometric relationship between the first and second images;

a memory coupled to the registration processor for storing parameters representative of the optimal transform; and a display system for forming a composite image representation of the first and second images.

16. The image processing system of claim 15, further comprising a diagnostic imaging scanner.

17. The image processing system of claim 16, wherein the diagnostic imaging scanner comprises an MR scanner, an x-ray CT scanner, and PET scanner, a SPECT scanner, an ultrasound scanner, or a combination thereof.

18. The image processing system of claim 15, further including a display on which a composite image is displayed.

19. A image processing system for registering a first volumetric image and a second volumetric image, the volumetric images including three-dimensional arrays of voxel values, the system comprising:

a registration processor, a memory which stores precomputed mutation probability values, and an associated memory which stores a plurality of volumetric image representations to be registered, the registration processor:

accessing the stored pre-computed mutation probability values to determine mutation probabilities for a plurality of aligned pairs of the voxel values, the aligned pairs of voxel values comprising a voxel value from the first image and a spatially corresponding voxel value from the second image, each mutation probability being related to the likelihood that a voxel value in the first image corresponds to a spatially corresponding voxel value in the second image and vice versa, said defining being based on a selected geometric relationship of the first and second images;

calculating a measure of the likelihood for a plurality of geometric relationships between the first and second images, the measure of likelihood being calculated for a predetermined set of aligned voxel pairs using the mutation probabilities, and the measure of the likelihood being indicative of the probability of obtaining the first image given the second image and vice versa; and optimizing the measure of likelihood to find an optimal transform defining a geometric relationship between the first and second images;

a memory coupled to the registration processor for storing parameters representative of the optimal transform; and a display system for forming a composite image representation of the first and second images.

20. The image processing system of claim 15, wherein the defining of mutation probabilities includes estimating mutation probabilities based on a currently selected transform defining a geometric relationship of the second image relative to the first image.

21. The image processing system of claim 15, wherein the measure of the likelihood is symmetrical.

22. An article of manufacture comprising a computer useable medium having a computer readable code embodied in the medium for registering a first volumetric image and a second volumetric image, each image comprising a three-dimensional array of gray scale voxel values, the computer readable program code in the article of manufacture comprising:

(a) computer readable program code for defining mutation probabilities for a plurality of aligned pairs of the voxel values, the aligned pairs of voxel values comprising a voxel value from the first image and a spatially corresponding voxel value from the second image, each mutation probability being related to the likelihood that a voxel value in the first image corresponds to a spatially corresponding voxel value in the second image and vive versa, said defining being based on a first geometric transform that defines a geometric relationship between the first and second images;

(b) computer readable program code for calculating a measure of the likelihood for a predetermined set of aligned voxel pairs using the mutation probabilities, the measure of the likelihood being indicative of the probability of obtaining the first image given the second image and vice versa wherein the measure of likelihood has an upper bound of 1; and, (c) computer readable program code for iteratively adjusting the geometric transform and recalculating the likelihood measure until an optimal geometric transform defining a geometric relationship of the second image relative to the first image is calculated, the optimal transform providing an optimal measure of the likelihood.

23. A method for imparting information to a user of an image processing system, the image processing system being of a type for registering volumetric images, the method comprising:

(a) providing first and second volumetric images, each image comprising a three-dimensional array of gray scale voxel values;

(b) defining mutation probabilities for a plurality of aligned pairs of the voxel values, the aligned pairs of voxel values comprising a voxel value from the first image and a spatially corresponding voxel value from the second image, each mutation probability being related to the likelihood that a voxel value in the first image corresponds to a spatially corresponding voxel value in the second image and that the voxel in the second image corresponds to the spatially corresponding voxel in the first image, said defining being based on a selected geometric relationship of the first and second images;

(c) selecting a first transform defining a geometric relationship of the second image relative to the first image;

(d) calculating and normalizing the likelihood for a predetermined set of aligned voxel pairs using the mutation probabilities to produce a normalized measure of the likelihood, the normalized measure of the likelihood being an indicium of the probability of obtaining the first image given the second image and of obtaining the second image given the first image, the normalized measure being bounded within a preselected and finite range of values wherein the normalized measure of the likelihook has an upper bound of 1;

(e) selecting a different transform defining a geometric relationship of the second image relative to the first image;

(f) iteratively repeating steps (d) and (e) until an optimal transform defining a geometric relationship of the second image relative to the first image is calculated, the optimal transform providing an optimal normalized measure of the likelihood;

(g) registering the first and second images using the optimal transform; and (h) outputting the normalized measure, wherein the normalized measure approaches one end of the finite range as the quality of the registration increases, the normalized measure thereby serving to identify to the user the quality of the registration.

24. A method for imparting information to a user of an image processing system, the image processing system being of a type for registering volumetric images, the method comprising:

(a) receiving first and second volumetric images, each image comprising a three-dimensional array of voxel values;

(b) defining mutation probabilities for a plurality of aligned pairs of the voxel values, the aligned pairs of voxel values including a voxel value from the first image and a spatially corresponding voxel value from the second image, each mutation probability being related to the likelihood that a voxel value in the first image corresponds to a spatially corresponding voxel value in the second image and that the voxel in the second image corresponds to the spatially corresponding voxel in the first image, said defining being based on a geometric relationship of the first and second images;

(c) selecting a first transform defining a geometric relationship of the second image relative to the first image;

(d) calculating and normalizing the likelihood for a predetermined set of aligned voxel pairs using the mutation probabilities to produce a normalized measure of the likelihood, the normalized measure of the likelihood being indicative of the probability of obtaining the first image given the second image and of obtaining the second image given the first image, the normalized measure being bounded within a preselected and finite range of values, calculating the measure of the likelihood including:

calculating, as a sum of logarithms of the mutation probabilities, a first logarithmic likelihood value being an indicium of the probability of obtaining the first image given the second image for the predetermined set of aligned voxel pairs;

calculating, as a sum of logarithms of the mutation probabilities, a second logarithmic likelihood value being an indicium of the probability of obtaining the second image given the first image for the predetermined set of aligned voxel pairs; and adding the first and second logarithmic likelihood values to produce a value of from zero to one, wherein an increased value indicates increased registration quality, the normalized measure approaching one end of the finite range as the quality of the registration increases, (e) selecting a different transform defining a geometric relationship of the second image relative to the first image;

(f) iteratively repeating steps (d) and (e) until an optimal transform defining a geometric relationship of the second image relative to the first image is calculated, the optimal transform providing an optimal normalized measure of the likelihood, (g) registering the first and second images using the optimal transform; and (h) outputting the normalized measure to identify the quality of the registration to the user.

\* \* \* \* \*